(12) United States Patent
Takeda

(10) Patent No.: US 7,695,044 B2
(45) Date of Patent: Apr. 13, 2010

(54) UNDER-COVER SUPPORT STRUCTURE

(75) Inventor: Satoshi Takeda, Sagamihara (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 12/186,066

(22) Filed: Aug. 5, 2008

(65) Prior Publication Data

US 2009/0039667 A1 Feb. 12, 2009

(30) Foreign Application Priority Data

Aug. 10, 2007 (JP) .............................. 2007-209718

(51) Int. Cl.
*B62D 25/14* (2006.01)
(52) U.S. Cl. ...................................................... 296/70
(58) Field of Classification Search .................. 296/70, 296/72, 74
See application file for complete search history.

(56) References Cited

U.S. PATENT DOCUMENTS

| 5,082,078 A | * | 1/1992 | Umeda et al. | ................. 180/90 |
|---|---|---|---|---|
| 6,601,902 B1 | * | 8/2003 | Rahmstorf et al. | ............ 296/70 |
| 7,481,457 B2 | * | 1/2009 | Best et al. | ..................... 280/752 |
| 2002/0008399 A1 | * | 1/2002 | Yasuta et al. | .................. 296/72 |
| 2002/0113453 A1 | * | 8/2002 | Takano et al. | ................. 296/70 |
| 2007/0210603 A1 | * | 9/2007 | Hanson et al. | ................ 296/70 |
| 2009/0033126 A1 | * | 2/2009 | Mullen et al. | .......... 296/193.02 |
| 2009/0174216 A1 | * | 7/2009 | Penner | ........................ 296/72 |

FOREIGN PATENT DOCUMENTS

| DE | 10 2006 021 222 A1 | 2/2007 |
|---|---|---|
| JP | 2004-268865 A | 9/2004 |

* cited by examiner

*Primary Examiner*—H Gutman
(74) *Attorney, Agent, or Firm*—Foley & Lardner LLP

(57) ABSTRACT

An under-cover support structure comprising: a dash panel provided in a front part of a vehicle cabin; a dash insulator attached to and extending along a cabin-side surface of the dash panel; an instrument panel mounted on the dash insulator in an inner side of the vehicle cabin; and an under cover member bridged between the cabin-side surface of the dash panel and a forward edge of a lower edge portion of the instrument panel, and covering a lower side of the instrument panel, the under cover member having a press-fit end portion on a side of the dash insulator, wherein the dash insulator is provided with a supporting portion which is elastically deformable by the press-fit end portion of the under cover member being pressed against the supporting portion.

9 Claims, 12 Drawing Sheets

UNDER-COVER SUPPORT STRUCTURE

BACKGROUND OF THE INVENTION

1. Field of the Invention

The present invention relates to a structure for supporting a vehicle interior cover, and particularly to a structure for supporting an under cover that covers the lower side of an instrument panel.

2. Description of the Related Art

Japanese Patent Application Publication No. 2004-268865 discloses an under-cover support structure for supporting an under cover member that is bridged between a dash panel and an instrument panel to cover the lower side of the instrument panel.

In this structure, the dash panel is provided in the front part of the vehicle cabin. The dash panel has stud bolts protruding from the cabin-side surface of the dash panel. The bolt holes are formed in an end portion on the side of the dash-panel of the under cover member. The stud bolts are inserted into the bolt holes, and thereby support the under cover member.

Clips are provided at the rearward edge portion of the under cover member to serve as engaging members. Clip holes are formed in the lower forward edge portion of the instrument panel extending toward the dash panel. The clips are inserted into the clip holes from beneath to be locked therein.

In this under-cover support structure, the under cover member is secured the dash panel and the instrument panel as follows. Firstly, the stud bolts provided on the dash panel are inserted into the bolt holes formed in the under cover member, so that the dash-panel-side end portion of the under cover member is engaged with the dash panel. Thereafter, the rearward edge portion of the under cover member is lifted upward, and the under cover member is thereby rotated about the locked dash-panel-side end portion of the under cover member. Consequently, the clips are inserted into the clip holes from beneath to be locked therein.

SUMMARY OF THE INVENTION

However, in the above-described under-cover support structure, the stud bolts, which are provided on the dash panel in a protruding manner, need to be aligned with the bolt holes, which are formed in the dash-panel-side end portion of the under cover member, before being inserted thereto, for attaching the under cover member.

This makes the attachment work difficult. Moreover, the under cover member may possibly be damaged due to contact of the tip of the stud bolt with a peripheral part of the bolt hole of the under cover member.

In view of the above problems, an object of the present invention is to provide an under-cover support structure which facilitates the attachment work of the under cover member.

An aspect of the present invention is an under-cover support structure comprising: a dash panel provided in a front part of a vehicle cabin; a dash insulator attached to and extending along a cabin-side surface of the dash panel; an instrument panel mounted on the dash insulator in an inner side of the vehicle cabin; and an under cover member bridged between the cabin-side surface of the dash panel and a forward edge of a lower edge portion of the instrument panel, and covering a lower side of the instrument panel, the under cover member having a press-fit end portion on a side of the dash insulator, wherein the dash insulator is provided with a supporting portion which is elastically deformable by the press-fit end portion of the under cover member being pressed against the supporting portion.

BRIEF DESCRIPTION OF THE DRAWINGS

The invention will now be described with reference to the accompanying drawings wherein.

DETAILED DESCRIPTION OF THE EMBODIMENT

Figure 1:
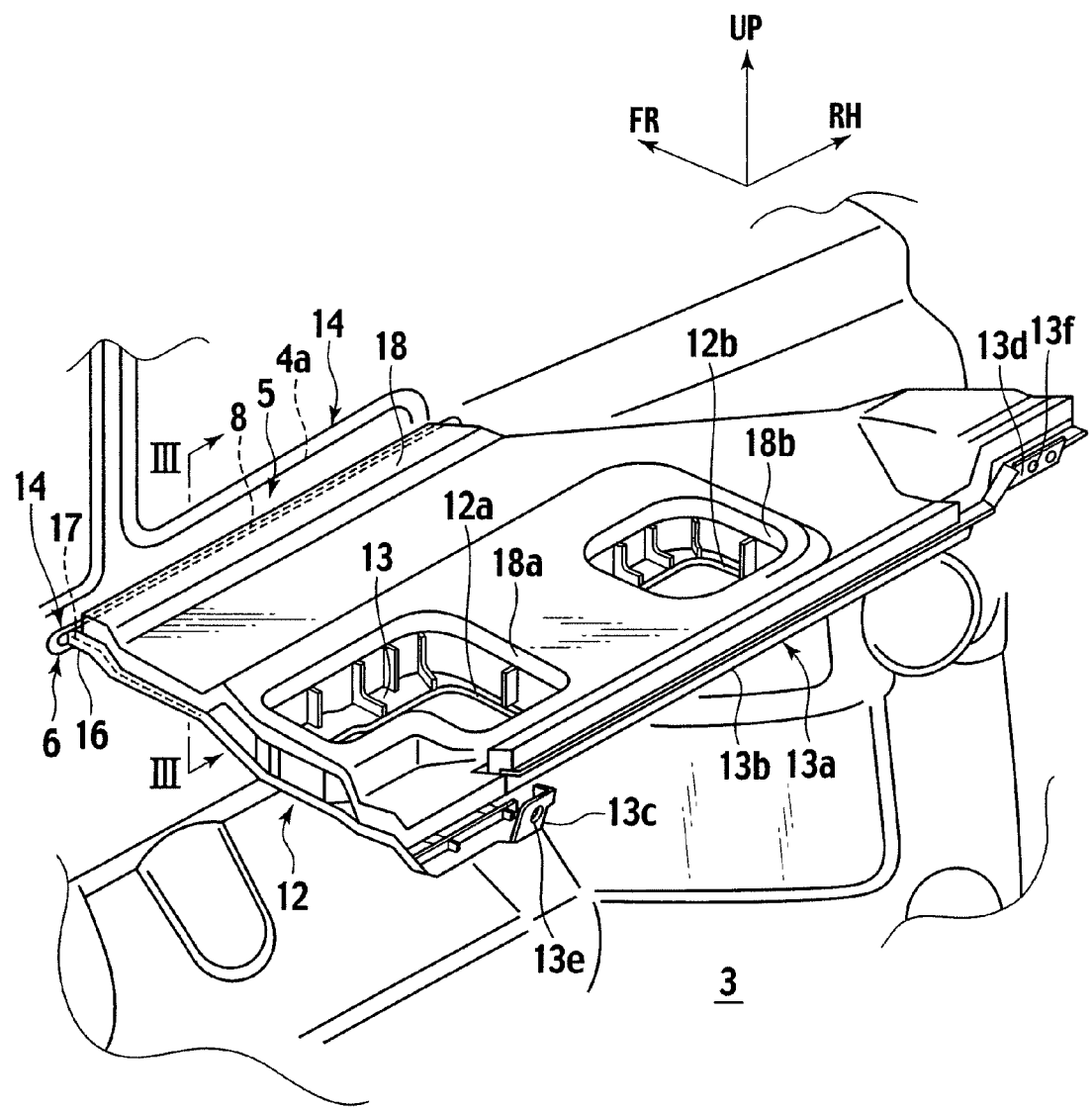
FIG. 1 is a perspective view showing a state in which an under cover member is press-fitted into a recessed portion of a dash insulator in an under-cover support structure according to an embodiment of the present invention.

An under-cover support structure according to an embodiment of the present invention will be described below with reference to the accompanying drawings.

In this embodiment, description will be given mainly of a structure for supporting an under cover member 12 provided on the passenger-seat side in a left-hand drive automobile (on the right side in the vehicle). An under cover member is provided also on the driver-seat side (on the left side in the vehicle) as well as on the passenger-seat side, and has the substantially same configuration as that of the passenger-seat side. Accordingly, the description is omitted herein.

The vehicle body 1 of the automobile includes an engine room 2 for housing an engine (not shown) therein, and a passenger compartment 3 located on the rear side in the front-rear direction of the vehicle, which serves as a vehicle cabin for passengers to be seated in. In this embodiment, a dash panel 4 is provided between the engine room 2 and the passenger compartment 3, and defines the engine room 2 and the passenger compartment 3.

Figure 2:
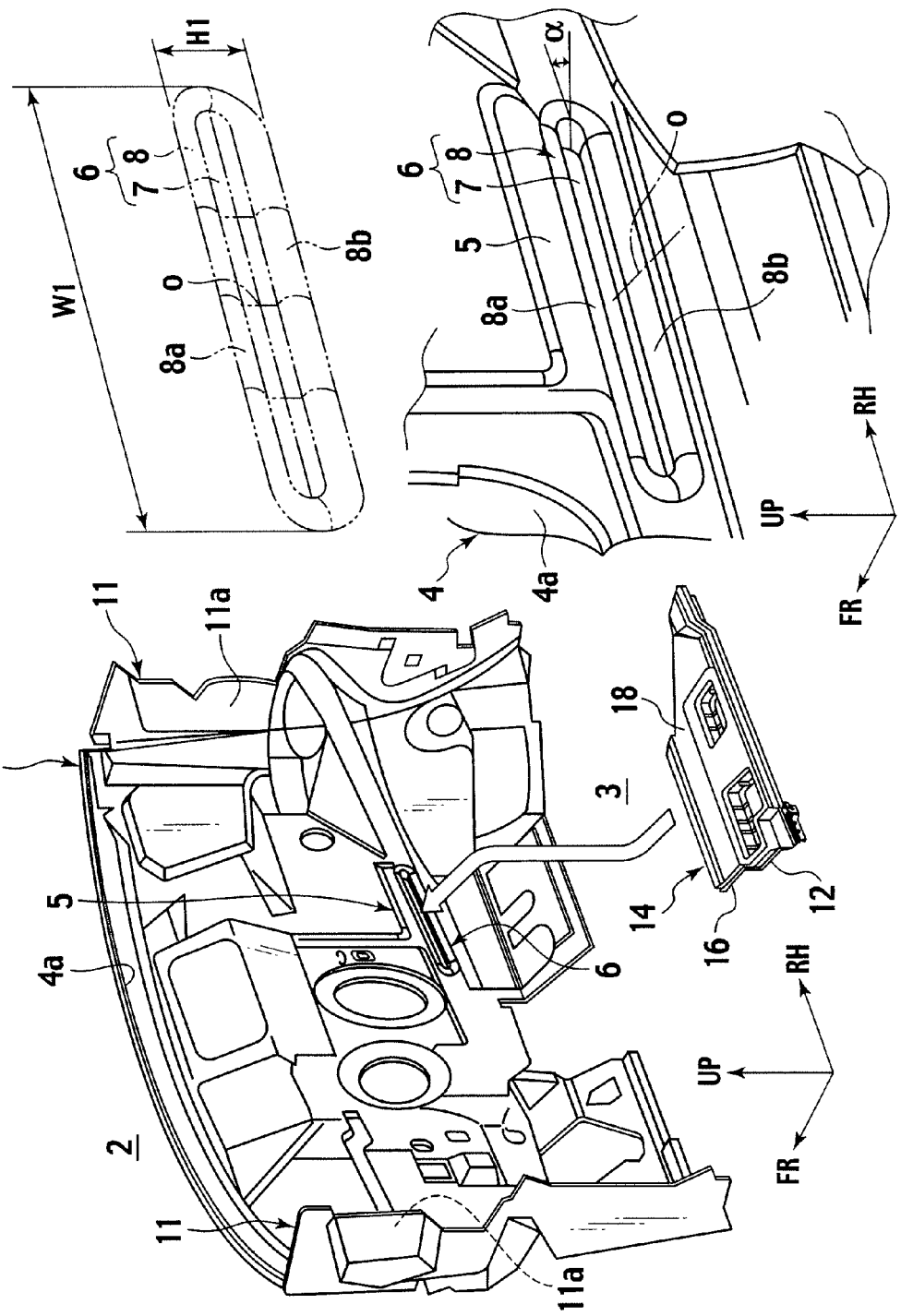
FIG. 2 is an exploded perspective view of the under-cover support structure according to the embodiment, for illustrating a configuration of the dash insulator, which is adhered to a dash panel, and an under cover member.

As shown in FIG. 2, a dash insulator 5 serving as a sound-absorbing member is adhered to a surface 4a of the dash panel 4 on a side of the vehicle cabin (hereinafter, simply referred to as "cabin-side surface 4a").

On a cabin-side surface of the dash insulator 5, a recessed portion 6 serving as a supporting portion for supporting the forward edge portion of the below-mentioned under cover member 12 is formed.

As shown in FIG. 2, the recessed portion 6 is a recess that extends approximately horizontally in the vehicle-width direction, and that substantially has a shape of a slotted hole when seen from the front thereof. The recessed portion 6 includes a bottom portion 7 having an elongated narrow shape, and a guide slope portion 8 formed around the periphery of the bottom portion 7. The guide slope portion 8 has a curved surface whose angle of inclination α gradually increases to a right angle as the measuring point of the angle of inclination α moves from the periphery of the recessed portion 6 to the bottom portion 7. In a semicircular part at each end of the recessed portion 6, the angle of inclination α is an angle which a tangent to a surface of the guide slope portion 8 in the cross section including the symmetry axis of the semicircular part makes with respect to a major plane surface, of the cabin-side surface of the dash insulator 5, around the recessed portion 6. Meanwhile, in the parts other than the semicircular parts, the angle of inclination α is an angle which a tangent to a surface of the guide slope portion 8 in a cross section perpendicular to the long axis of the recessed portion 6 makes with respect to the major plane surface, of the cabin-side surface of the dash insulator 5, around the recessed portion 6.

The guide slope portion 8 of the recessed portion 6 is formed of the same composite member as that constituting a portion of the dash insulator 5 around the recessed portion 6, and is elastically deformable when pressure is applied from the cabin side.

Figure 3:
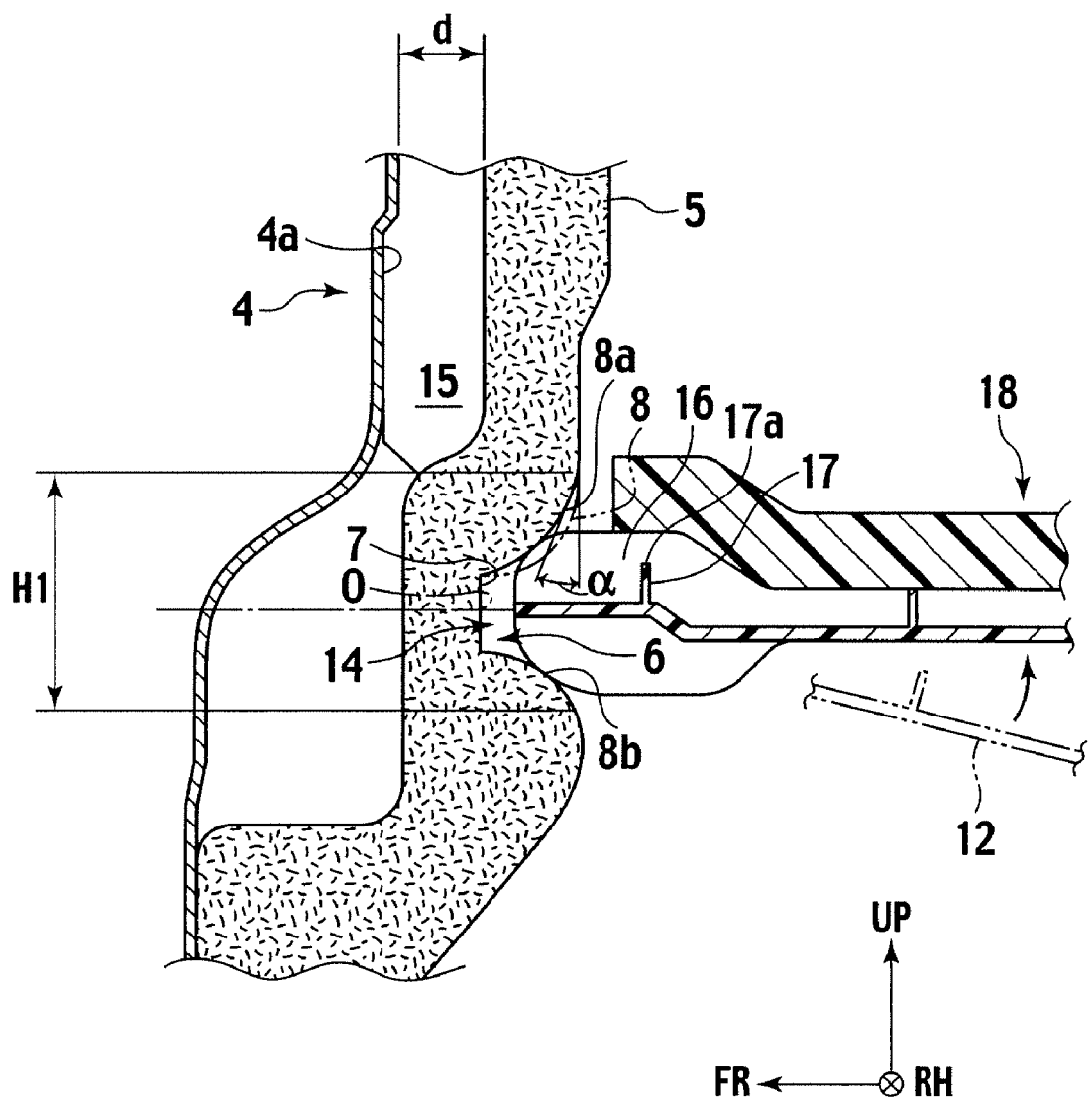
FIG. 3 is a cross-sectional view of the under-cover support structure according to the embodiment, the view being taken along the III-III line in FIG. 1.

Moreover, a hollow portion 15 is formed on the front side of an upper periphery 8a of the guide slope portion 8 as shown in FIG. 3, which serves as a more deformable portion to make the upper periphery 8a more deformable, or, specifically, more elastically deformable under relatively small pressure, compared to a lower periphery 8b of the guide slope portion 8.

The hollow portion 15 is a gap having a fixed width d that is formed between portions of the dash insulator 5 and the dash panel 4 above the recessed portion 6.

Figure 5:
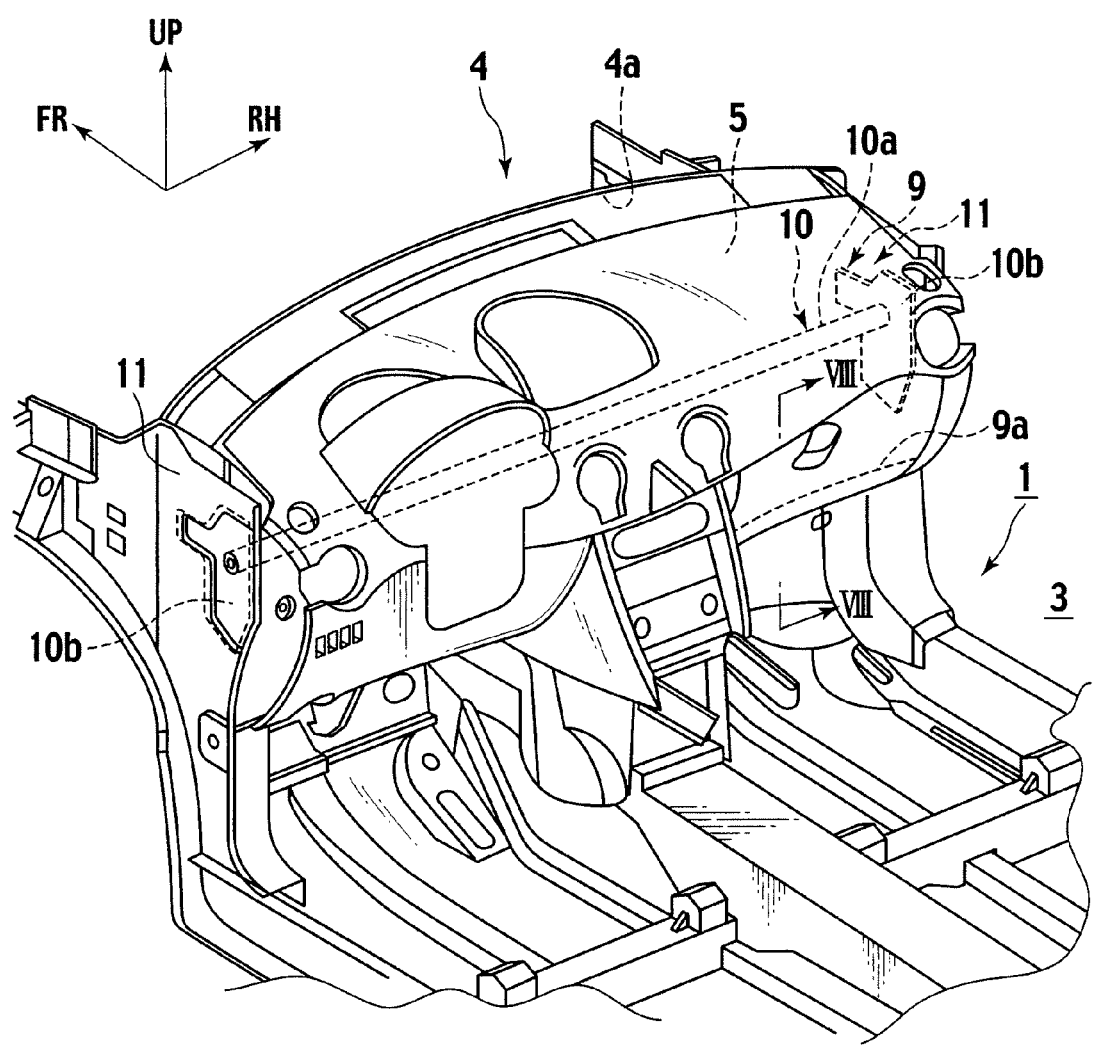
FIG. 5 is a perspective view illustrating a state in which the instrument panel is mounted on a vehicle body in which the under-cover support structure according to the embodiment is employed.

An instrument panel 9 is mounted, as shown in FIG. 5, on the rear side of the dash insulator 5, that is, in the inner side of the vehicle cabin.

A steering member 10 for supporting a steering column (not shown) is provided inside the instrument panel 9 so as to extend in the vehicle-width direction.

Figure 4:
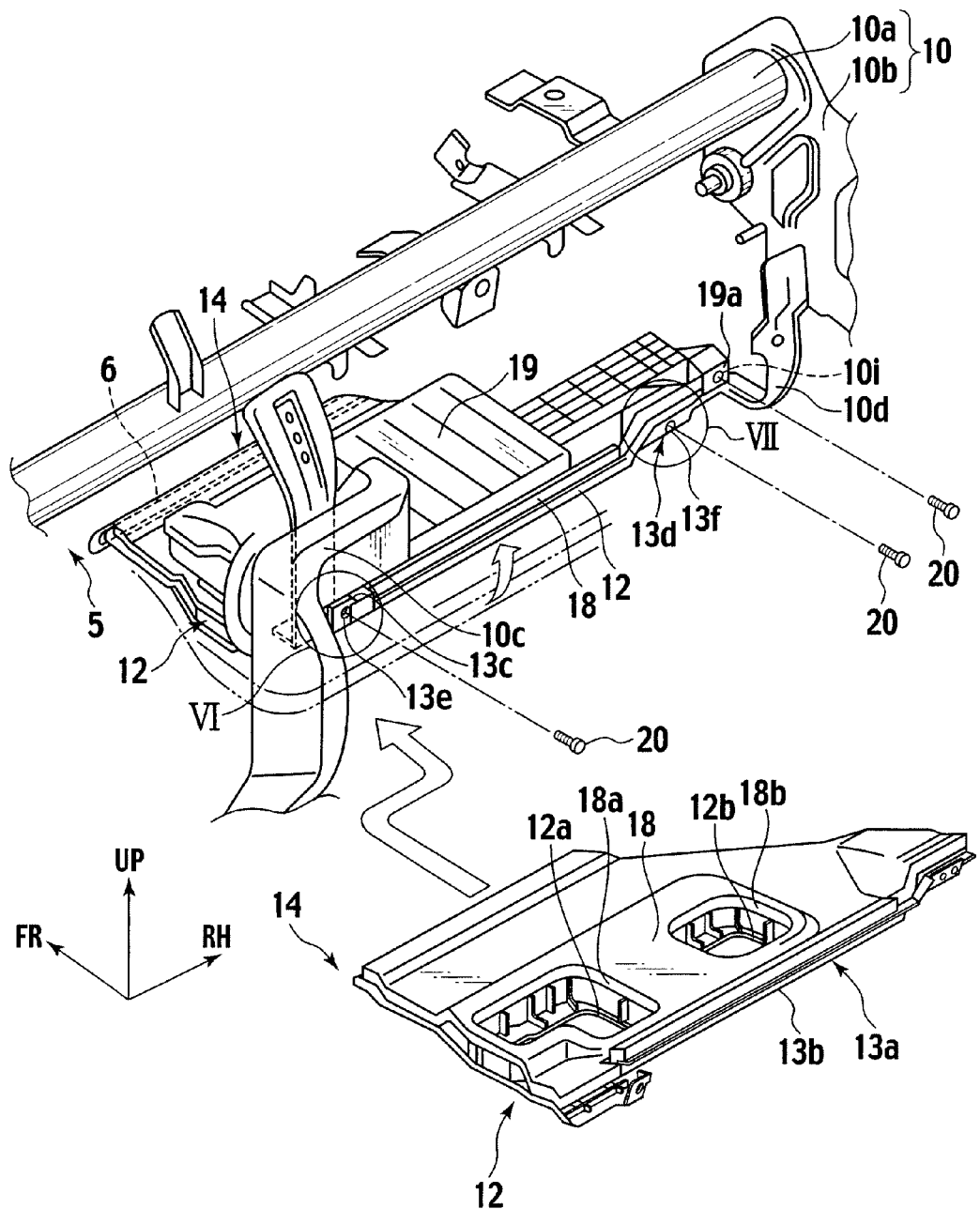
FIG. 4 is an exploded perspective view of the under-cover support structure according to the embodiment, for illustrating a state in which the under cover member is fitted to the lower-surface side of an air-conditioning duct provided on a steering member inside an instrument panel.

As shown in FIG. 4, the steering member 10 includes a main body 10a having an approximate cylindrical pipe shape, and a pair of side brackets 10b integrally provided respectively at right and left ends of the main body 10a.

The dash panel 4 is provided, at both ends thereof in the vehicle-width direction, with a pair of inner-side panels 11 each integrally extending rearward from the end of the dash panel 4. The right and left side brackets 10b of the steering member 10 are fixedly attached to inner surfaces 11a of the inner side panels 11, respectively. Thereby, the steering member 10 is fixed to the vehicle body 1.

An H-bag-side fixing arm or a central fixing arm 10c is provided on the main body 10a of the steering member 10 so as to extend downward from the proximity of the center of the main body 10a in the vehicle-width direction.

A side-panel-side fixing arm 10d is integrally formed to extend from the side bracket 10b on the right side of the vehicle.

Figure 6:
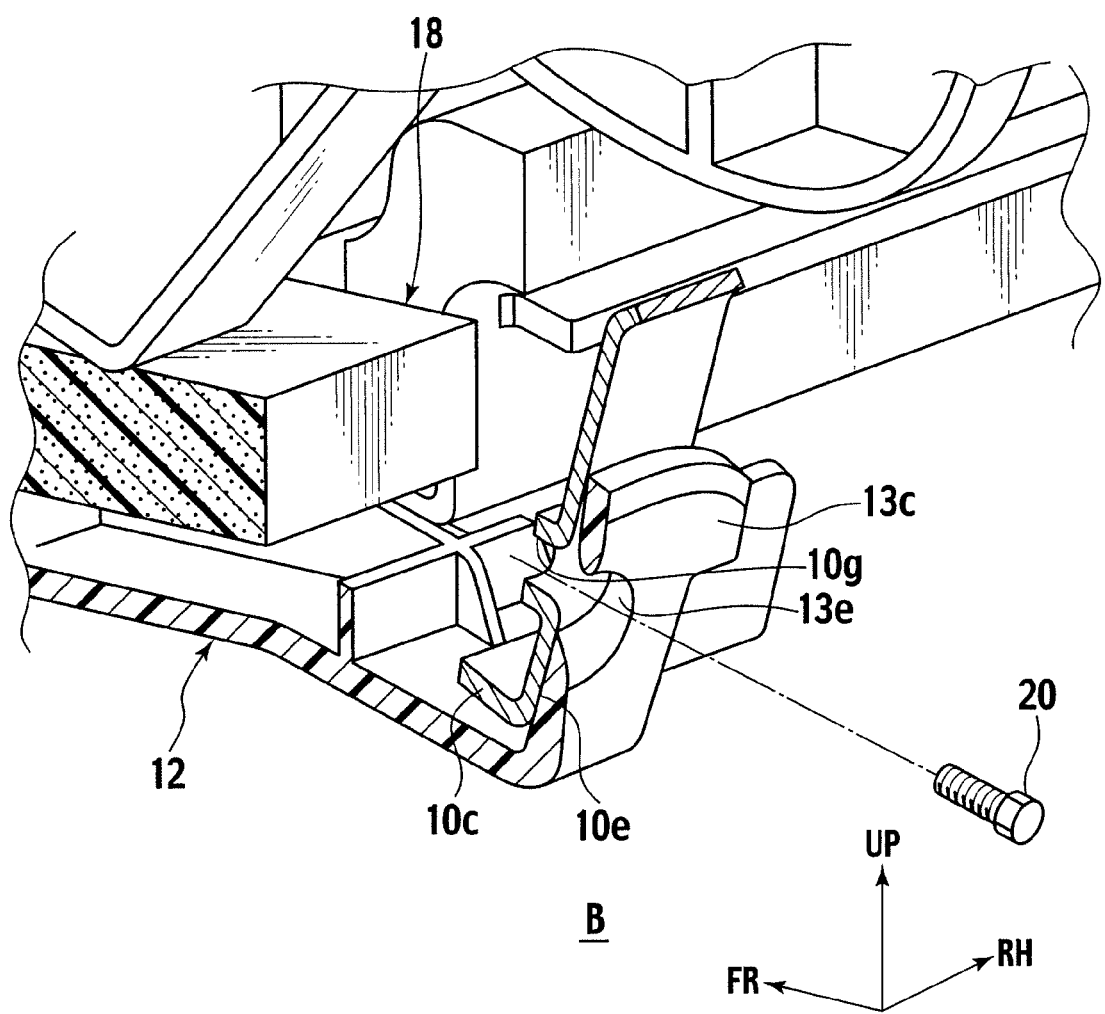
FIG. 6 is an enlarged cross-sectional view of the part VI of the under-cover support structure according to the embodiment shown in FIG. 4.
Figure 7:
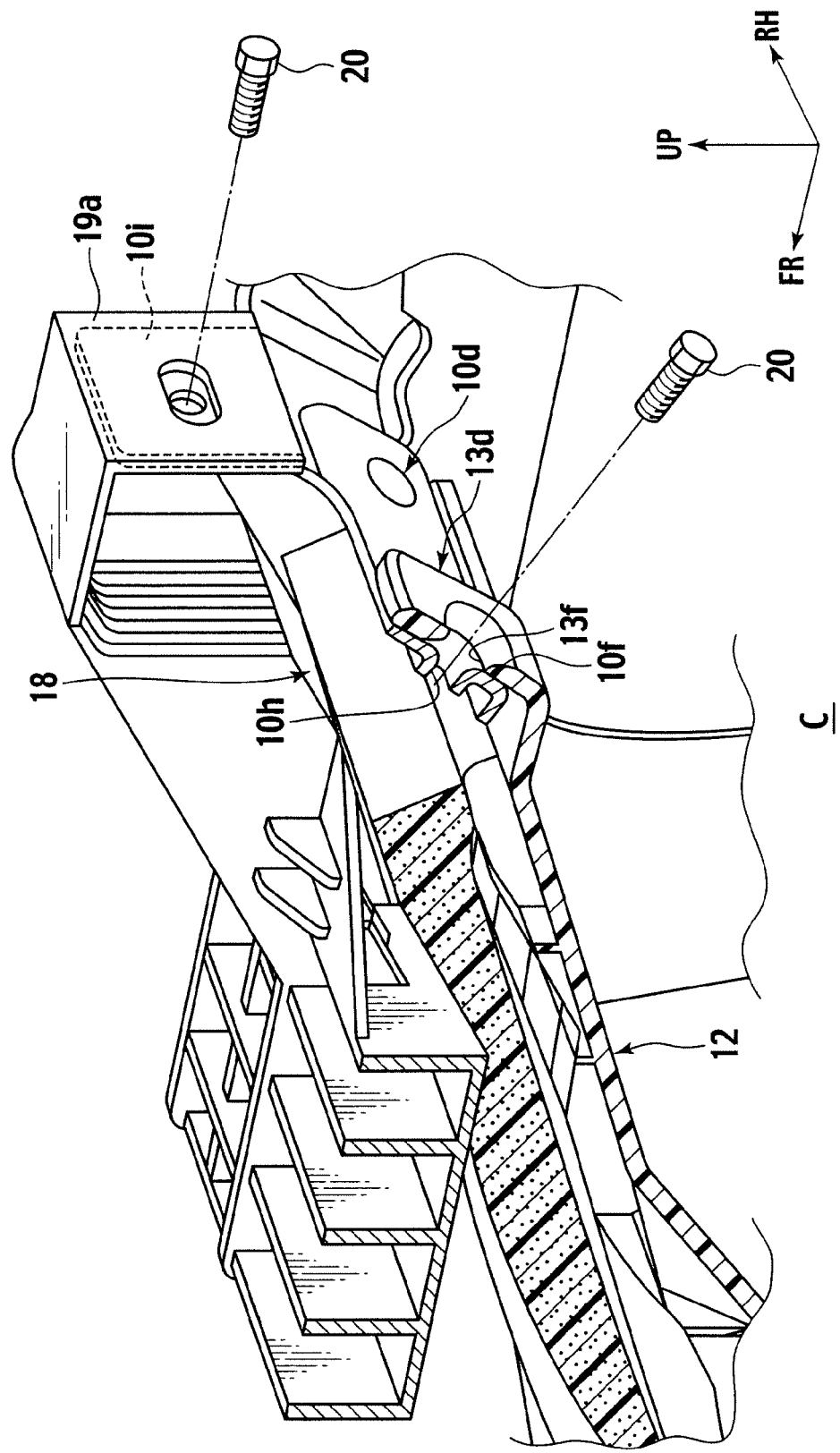
FIG. 7 is an enlarged cross-sectional view of the part VII of the under-cover support structure according to the embodiment shown in FIG. 4.

Bolt holes 10g and 10h are formed on a seating face 10e of the H-bag-side fixing arm 10c and a seating face 10f of the side-panel-side fixing arm 10d, respectively, as shown in FIGS. 6 and 7, by means of hole-boring process. Each of the seating faces is formed approximately perpendicular to but slightly inclined rearward with respect to a virtual plain including the long axis of the recessed portion 6 and the center of the corresponding bolt hole.

Figure 8:
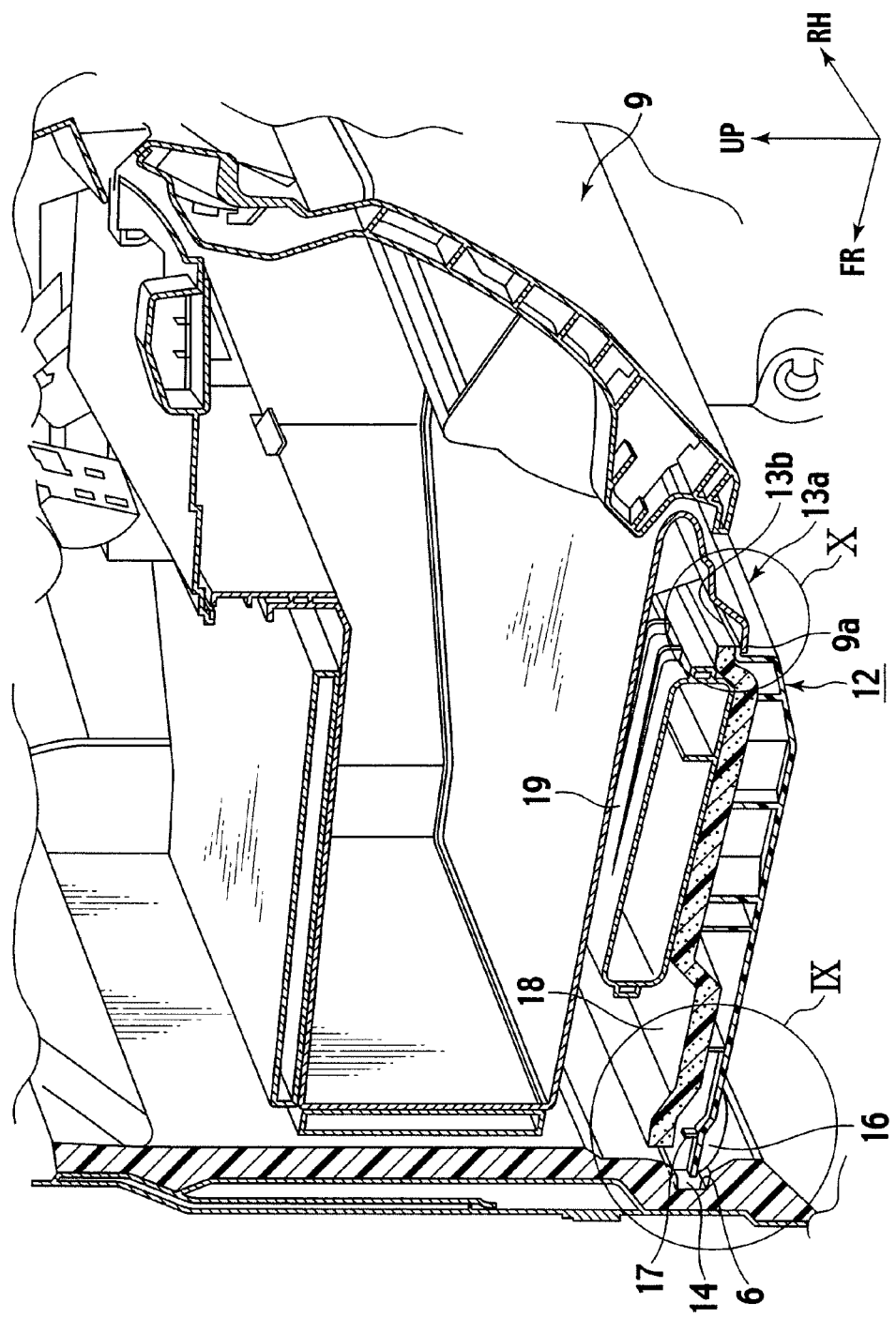
FIG. 8 is a cross-sectional view of the under-cover support structure according to the embodiment, the view being taken along the line VIII-VIII in FIG. 5.
Figure 9:
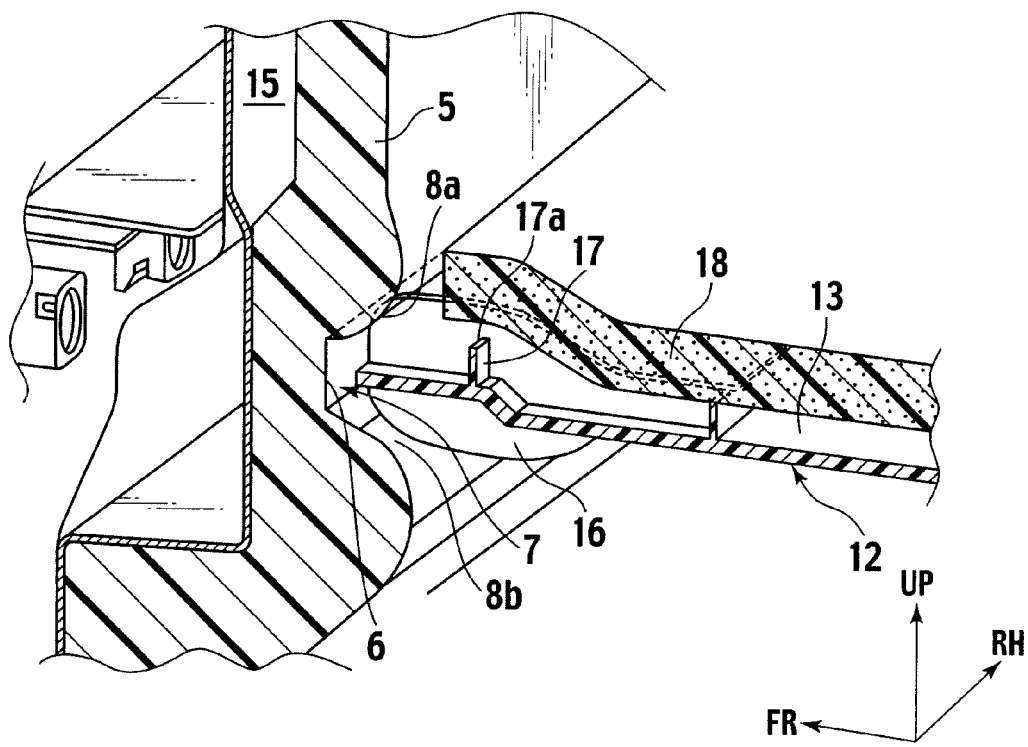
FIG. 9 is an enlarged cross-sectional view of the part IX of the under-cover support structure according to the embodiment shown in FIG. 8.

Between the dash insulator 5 attached to and extending along the cabin-side surface 4a of the dash panel 4 and a forward edge 9a of the lower edge portion of the instrument panel 9, an under cover member 12 is bridged to cover the lower side of the instrument panel 9 (see FIG. 8).

Figure 11:
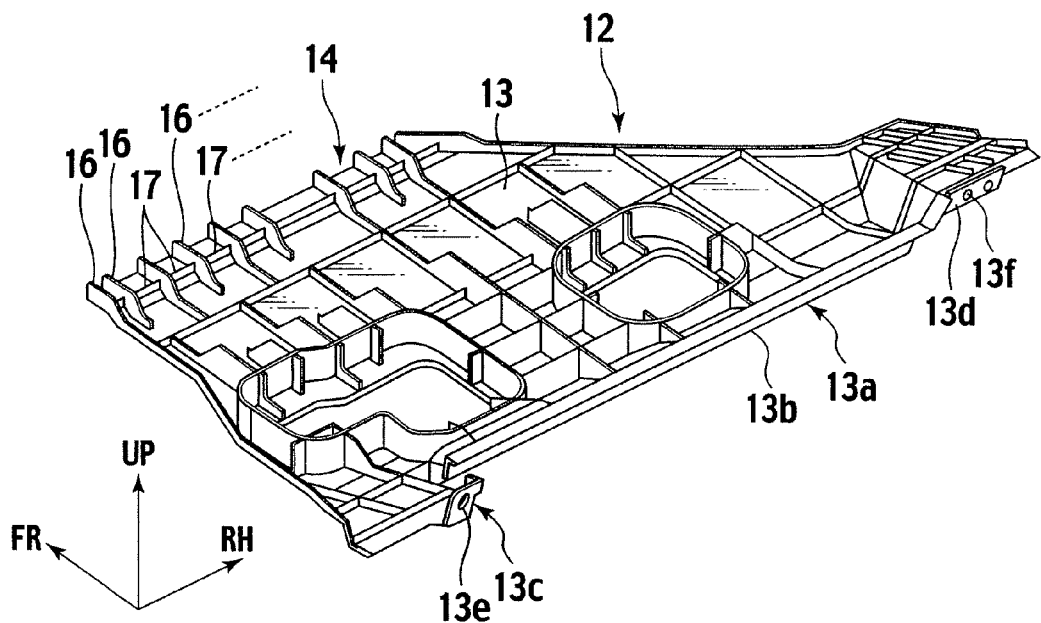
FIG. 11 is a perspective view illustrating a configuration of the under cover member in the under-cover support structure according to the embodiment.

The under cover member 12, as shown in FIG. 11, is mainly constituted of a sound insulation board 13, which is a plain plate having an approximately trapezoidal shape in plan view. The shape of the plain plate conforms to the shape of a downward opening formed between the dash insulator 5 and the forward edge 9a of the lower edge portion of the instrument panel 9.

Figure 12:
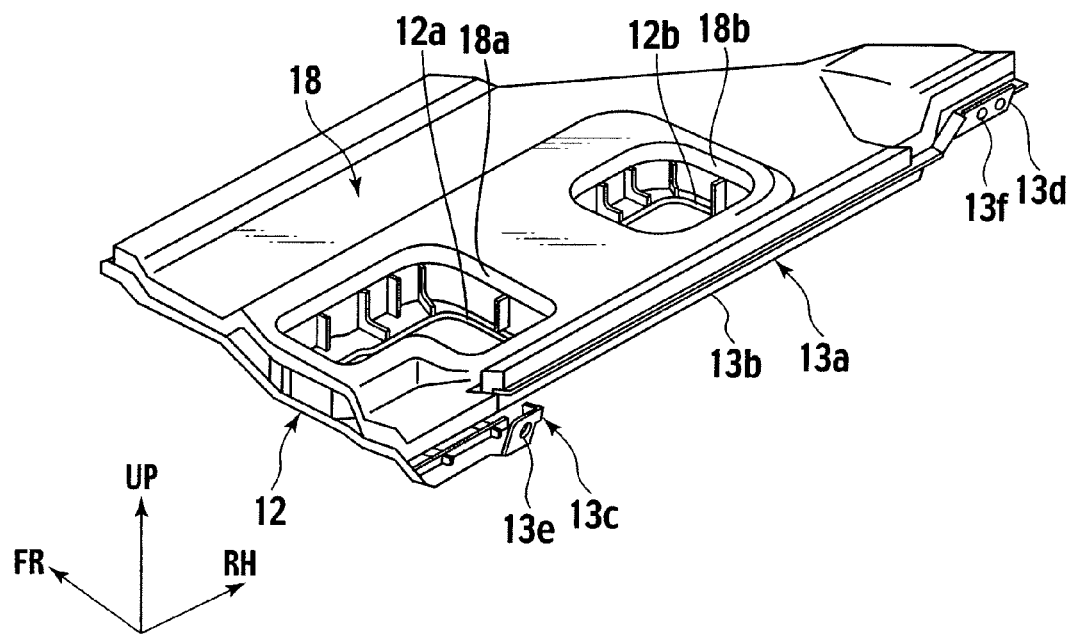
FIG. 12 is a perspective view illustrating a configuration in which a duct insulator is set on the under cover member in the under-cover support structure according to the embodiment.

Duct insertion openings 12a and 12b are formed in the sound insulation plate 13 (see FIG. 12).

A press-fit end portion 14 on the side of the dash insulator (hereinafter, referred to as a dash-insulator-side press-fit end portion 14), which is to be press-fitted into the recessed portion 6 formed in the dash insulator 5, is formed at the forward edge portion of the sound insulation plate 13 (see FIGS. 8 and 11).

At the dash-insulator-side press-fit end portion 14, a plurality of perpendicular ribs 16 are provided at regular intervals, along the forward edge of the sound insulation plate 13 of the under cover member 12, the perpendicular ribs 16 each being perpendicular to the upper or lower surface of the sound insulation plate 13. Each of the perpendicular ribs 16 is formed in a standing manner to extend from the upper or lower surface of the forward edge of the sound insulation plate 13, and is formed in a plain plate shape having a normal vector almost parallel to the vehicle-width direction or the forward edge of the sound insulation plate 13. Moreover, each of the perpendicular ribs 16 has an R-shape at the forward edge thereof, or an R-shape extending from the forward edge thereof to the upper or lower edge thereof.

Moreover, reinforcing ribs 17 are provided on at least one of the upper and lower surfaces of the sound insulation plate 13, to connect each perpendicular rib 16. The reinforcing ribs 17 are perpendicular to the upper or lower surfaces of the sound insulation plate 13, and are extended approximately parallel to the vehicle-width direction or the forward edge of the sound insulation plate 13.

Figure 10:
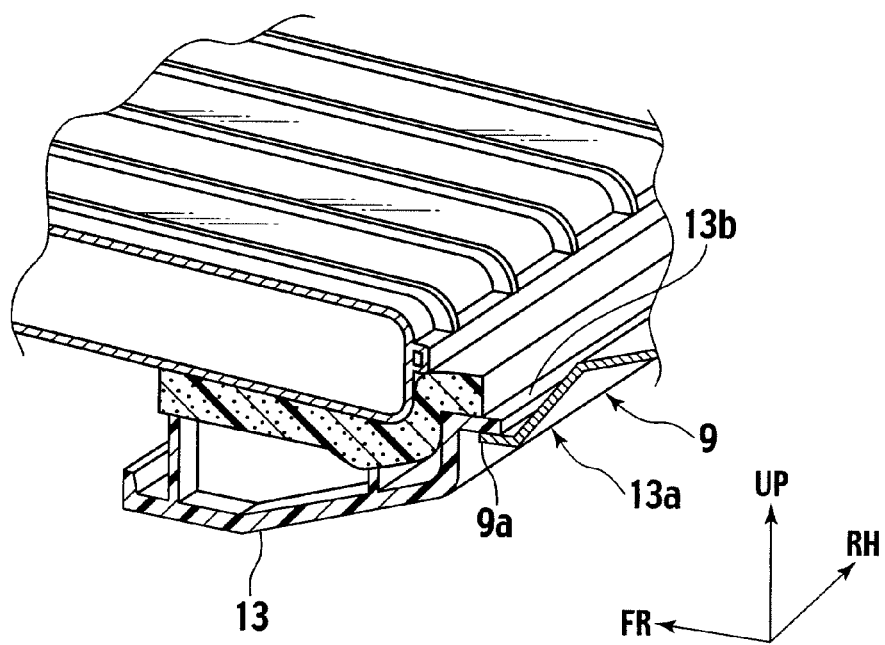
FIG. 10 is an enlarged cross-sectional view of the part X of the under-cover support structure according to the embodiment shown in FIG. 8.

Furthermore, an engaging blade 13b in a horizontal plate shape having a predetermined length in the vehicle-width direction is formed integrally at the rearward edge portion (cabin-side side edge) 13a of the sound insulation plate 13, as shown in FIGS. 8 and 10. The engaging blade 13b is extended rearward and has its rearward edge extending along the vehicle-width direction.

The engaging blade 13b is placed on the forward edge 9a of the lower edge portion of the instrument panel 9 from above in an overlapping manner, and is engaged with the forward edge 9a serving as a rear supporting portion. Specifically, the rear supporting portion is engaged with the rearward edge portion 13a of the under cover member 12 in the vertical direction approximately perpendicular to the direction of the press-fitting of the under cover member 12.

Right and left fixing pieces 13c and 13d are formed, on the right and left outer sides of the engaging blade 13b, to protrude from the rearward edge portion 13a of the under cover member 12. Each of the fixing pieces 13c and 13d extends upward approximately perpendicular to but slightly inclined rearward with respect to the major surface of the sound insulation plate 13 of the under cover member 12.

In the right and left fixing pieces 13d and 13c, fixing holes 13f and 13e are formed, respectively. The fixing holes 13e and 13f are formed in the positions corresponding to the bolt holes 10g and 10h formed in seating faces 10e and 10f of the H-bag-side fixing arm 10c and the side-panel-side fixing arm 10d, respectively, when the under cover member 12 is fitted.

Bolt members 20 are inserted into the fixing holes 13e and 13f, respectively, from rear side. The inserted bolt members 20 are screwed into and fixed to the bolt holes 10g and 10h, and then the right and left fixing pieces 13d and 13c are fastened on seating faces 10f and 10e. Thereby, the rearward edge portion 13a of the under cover member 12 is fixed to the H-bag-side fixing arm 10c and the side-panel-side fixing arm 10d.

On the upper-surface side of the under cover member 12, a duct insulator member 18 is set to cover the upper-surface side thereof, as shown in FIG. 12. As shown in FIG. 4, the duct insulator member 18 is configured to be positioned between the under cover member 12 and a duct member 19, which is an air conditioner, after the under cover member 12 is fitted.

As shown in FIG. 1, duct insertion openings 18a and 18b, into which parts of the duct member 19 are inserted, are formed on the duct insulator member 18 at positions corresponding to the duct insertion openings 12a and 12b.

A side-panel-side fixing piece 19a of the duct member 19 is fixed to a duct fixing face 10i of the side-panel-side fixing arm 10d with another bolt member 20, as shown in FIGS. 4 and 7.

Next, effects of the vehicle under-cover structure according to this embodiment will be described.

In this embodiment, the steering member 10 as the one shown in FIG. 5 is fixed between the right and left inner side panels 11 shown in FIG. 2, and the instrument panel 9 is thereby mounted on the cabin-side surface 4a of the dash panel 4 of the vehicle body 1.

The air conditioner duct member 19 is attached to the instrument panel 9 in advance, as shown in FIG. 4.

The dash-insulator-side press-fit end portion 14 of the under cover member 12 is press-fitted into the recessed portion 6, which is formed in the dash insulator 5 adhered to the dash panel 4, from rear to front in a direction approximately parallel to the vehicle front-rear direction, as indicated by an arrow in FIG. 4.

As shown in FIGS. 2 and 3, the guide slope portion 8 is formed in the periphery of the recessed portion 6. Accordingly, the dash-insulator-side press-fit end portion 14 slides on and is guided by the guide slope portion 8 when being press-fitted, and is consequently aligned to the center O of the bottom portion 7 of the recessed portion 6. Thereby, the dash-insulator-side press-fit end portion 14 falls into a desired fitting position.

Here, even when the inserting position of the dash-insulator-side press-fit end portion 14 is not exactly aligned with the center O, the press-fit end portion 14 can be fitted into the desired fitting position due to the sliding guide function of the guide slope portion 8, as long as the inserting position of the press-fit end portion 14 remains within the range inside the outer peripheral edge of the guide slope portion 8 of H1 in height and W1 in width. Hence, the use of guide slope portion 8 makes the attachment of the under cover member 12 easier.

Then, as shown in FIG. 4, the under cover member 12 is rotated about the dash-insulator-side press-fit end portion 14 inserted into the recessed portion 6, by lifting the rearward edge portion 13a upward.

The duct insulator member 18 is adhered to the upper-surface side of the under cover member 12. Accordingly, when the under cover member 12 is rotated to the position in which the sound insulation board 13 takes an approximately horizontal position, the duct insulator member 18 results in being positioned along the lower side of the duct member 19, and covers the lower side of the duct member 19, as shown in FIG. 8.

In the above fitting process, the dash insulator 5 supports the dash-insulator-side press-fit end portion 14 of the under cover member 12 while being changed in shape by the contact pressure attributable to the press-fit pressure, as shown in FIG. 3. The dash-insulator-side press-fit end portion 14 of the under cover member 12 is supported by the dash panel 4 with the dash insulator 5 interposed therebetween. In this case, the press-fit end portion 14 is not touching the cabin-side surface 4a of the dash panel 4, i.e., the dash insulator 5 is not completely compressed between the dash-insulator-side press-fit end portion 14 and the cabin-side surface 4a of the dash panel 4. Thus, fitting of the dash-insulator-side press-fit end portion 14 of the under cover member 12 is completed only by pushing the under cover member 12 into the recessed portion 6 of the dash insulator 5 from the inner side of the vehicle cabin.

Thereafter, the forward pressure applied to the under cover member 12 is further increased once, and, at the same time, the under cover member 12 is rotated to a position in which the rearward edge portion 13a of the under cover member 12 passes over the forward edge 9a of the lower edge portion of the instrument panel 9. Then, the pressure is released. The under cover member 12 is thereby pushed rearward by the elastic force of the dash insulator 5, and the engaging blade 13b of the rearward edge portion 13a of the under cover member 12 is consequently positioned on the forward edge 9a of the lower edge portion of the instrument panel 9 in an overlapping manner, as shown in FIG. 10. Thereby, the under cover member 12 is engaged with the instrument panel 9.

In this state, the fixing hole 13e of the left fixing piece 13c is positioned to face the bolt hole 10g formed in the seating face 10e of the H-bag-side fixing arm 10c, as shown in FIG. 6. Similarly, the fixing hole 13f of the right fixing piece 13d is positioned to face the bolt hole 10h formed in the seating face 10f of the side-panel-side fixing arm 10d, as shown in FIG. 7. The right and left fixing pieces 13d and 13c being formed respectively on the right and left outer sides of the engaging blade 13b in a protruding manner.

The bolt members 20 are inserted respectively into the fixing holes 13e and 13f from rear, and are then screwed respectively into the bolt holes 10g and 10h, to fasten the right and left fixing pieces 13d and 13c respectively to the seating faces 10f and 10e. Thereby, the rearward edge portion 13a of the under cover member 12 can be easily fixed to the H-bag-side fixing arm 10c and the side-panel-side fixing arm 10d.

As described above, the attachment of the under cover member 12 is completed only by press-fitting the under cover member 12 into the recessed portion 6 of the dash insulator 5 from the inner side of the vehicle cabin, and by fixing the under cover member 12 with the bolt members 20 from the inner side of the vehicle cabin, in this embodiment. Hence, the attachment of the under cover member 12 can be easily performed.

In addition, the recessed portion 6 of the dash insulator 5 is constituted of the elastically deformable and flexible composite member, which is the same as that constituting other portions of the dash insulator 5. Accordingly, it is unlikely that the dash-insulator-side press-fit end portion 14 of the under cover member 12 is damaged when being fitted to the dash insulator 5.

Moreover, there is no necessity to additionally provide any cushioning material having cushioning properties, such as urethane foam. This makes it possible to suppress an increase in the number of components.

Furthermore, the dash-insulator-side press-fit end portion 14 of the under cover member 12 is pressed into the elastically deformable recessed portion 6 of the dash insulator 5, and is supported in the state of being press-fitted against the guide slope portion 8 of the recessed portion 6, which is elastically deformed by the pressure.

With this configuration, a dimension error or an assembly error of the under cover member 12 due to manufacturing variation can be compensated by the guide slope portion 8 of the recessed portion 6 being elastically deformable. In addition, the dash-insulator-side press-fit end portion 14 of the under cover member 12 can be supported by the cabin-side surface 4a of the dash panel 4 without having any gap between the dash insulator 5 and itself.

Moreover, as shown in FIG. 10, in this embodiment, the engaging blade 13b of the rearward edge portion 13a of the under cover member 12 is set on the forward edge 9a of the lower edge portion of the instrument panel 9 in an overlapping manner, and is engaged with the forward edge 9a in the vertical direction orthogonal to the vehicle front-rear direction, that is, to the press-fitting direction of the under cover member 12.

Accordingly, by adjusting the overlap width, a dimension error or an assembly error between the vehicle body 1 and the instrument panel 9 due to manufacturing variation can also be compensated besides a dimension error or an assembly error of the under cover member 12 due to manufacturing variation. This makes it possible to leave no gap around the under cover member 12, and also to achieve good sound insulation performance.

Furthermore, the plural perpendicular ribs 16 are provided on the dash-insulator-side press-fit end portion 14 at regular intervals in this embodiment.

With this configuration, the under cover member 12 can be reduced in weight. At the same time, a reduction in the amount of a material, such as synthetic resin, to be used for molding makes it possible to suppress an increase in manufacturing cost.

Here, the perpendicular ribs 16 are each in a plain plate shape having an R-shaped tip, and hence have small sliding resistance. Accordingly, the dash-insulator-side press-fit end portion 14 can be smoothly press-fitted into the recessed portion 6. Hence, this respect also contributes to the easy attachment of the under cover member 12.

As shown in FIG. 3, in this embodiment, the hollow portion 15 constituting the more deformable portion is formed in a position between the dash insulator 5 and the cabin-side surface 4a of the dash panel 4, the position being on the side of the upper periphery 8a of the guide slope portion 8.

With the hollow portion 15 formed therebetween, the upper periphery 8a of the recessed portion 6 is more deformable, compared to the lower periphery 8b of the recessed portion 6, by the pressure applied to the guide slope portion 8 when the dash-insulator-side press-fit end portion 14 is press-fitted into the recessed portion 6, and is hence elastically deformable by smaller pressure.

Meanwhile, the lower periphery 8b maintains its strength and rigidity higher than the upper periphery 8a, although the lower periphery 8b is constituted of the same composite member as that of other portions such as the upper periphery 8a. Accordingly, the lower periphery 8b can support the dash-insulator-side press-fit end portion 14 from below with deformation smaller than that of the upper periphery 8a. Consequently, the guide slope portion 8 of the recessed portion 6, as a whole, functions as a stepped portion with the lower side thereof projecting to a larger extent.

Thus, with the hollow portion 15 provided, it is possible to increase the length of stroke in the press-fitting direction, to moderately reduce the pressure required for press-fit, and also to obtain reaction force that is required for supporting the weight of the under cover member 12 and a load applied by the dash-insulator-side press-fit end portion 14, by employing a configuration in which the lower periphery 8b has high strength compared to the upper periphery 8a.

In addition, since the lower periphery 8b can be set to have smaller deformation than that of the upper periphery 8a when supporting the dash-insulator-side press-fit end portion 14, the high accuracy of the fitting position of the under cover member 12 in the vertical direction can be obtained.

Moreover, as shown in FIG. 11, in this embodiment, the reinforcing ribs 17 are integrally provided to extend on the upper-surface side of the sound insulation board 13 in the vehicle-width direction, or approximately parallel to the forward edge of the sound insulation board 13, to connect the perpendicular ribs 16.

With this configuration, the strengths of the perpendicular ribs 16 to a bending load are increased. In addition, vibrations of the sound insulation board 13 and the perpendicular ribs 16 are suppressed, whereby a good sound insulation performance can be achieved.

Moreover, a further improved sound insulation performance can be achieved by forming the reinforcing ribs 17, for example, in positions such that the air flow between the upper side and the lower side of the sound insulation board 13 is reduced or blocked.

FIRST EXAMPLE

Figure 13:
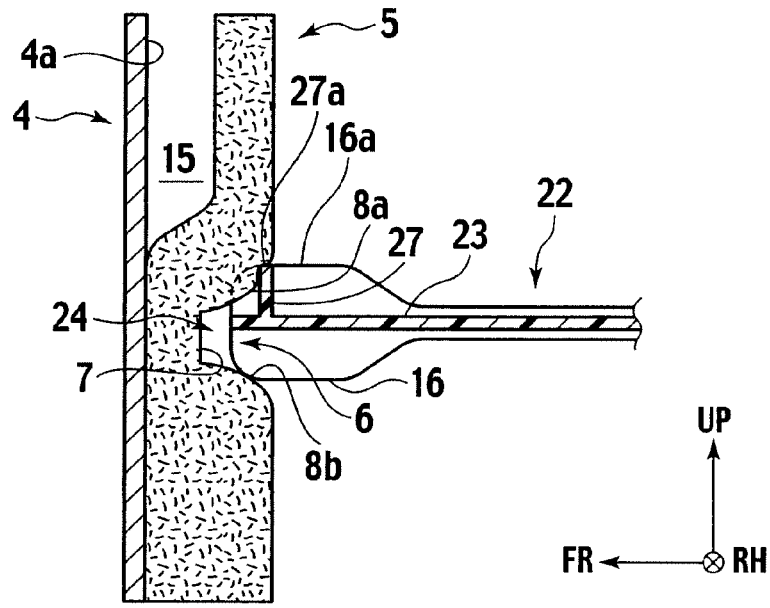
FIG. 13 is a cross-sectional view illustrating a configuration of a part of an under-cover support structure according to a first example, the part being corresponding to that shown in FIG. 3.

FIG. 13 shows a vehicle under-cover structure of a first example of the above-described embodiment of the present invention.

Here, components which are the same as, or similar to, those in the embodiment are denoted by the same reference numerals.

In the first example, reinforcing ribs 27 for connecting the perpendicular ribs 16 are provided on an upper surface of a sound insulation board 23 constituting an under cover member 22, the perpendicular ribs 16 being provided on a dash-insulator-side press-fit end portion 24.

The reinforcing ribs 27 are provided on the upper surface of the sound insulation board 23 so as to each extend approximately perpendicularly upward. Upper edges 27a of the reinforcing ribs 27 are positioned flush with the upper edges 16a of the perpendicular ribs 16.

The upper edges 27a of the reinforcing ribs 27 are configured to abut against the upper periphery 8a of the guide slope portion 8 across the entire width of the forward edge of the sound insulation board 23 in a state where the dash-insulator-side press-fit end portion 24 is press-fitted into the recessed portion 6 of the dash insulator 5.

The under-cover support structure of the first example configured as described above has the following effect in addition to those of the above-described embodiment. The upper edges 27a of the reinforcing ribs 27 abut against the upper periphery 8a of the guide slope portion 8 in a state where the dash-insulator-side press-fit end portion 24 is press-fitted into the recessed portion 6.

Accordingly, the air flow between the upper side and the lower side of the sound insulation board 23 is blocked by the reinforcing ribs 27. Hence, a further improved sound insulation performance can be achieved.

Since other configurations and effects of this under-cover support structure are same as, or similar to, those of the above-described embodiment, descriptions thereof are omitted here.

SECOND EXAMPLE

Figure 14:
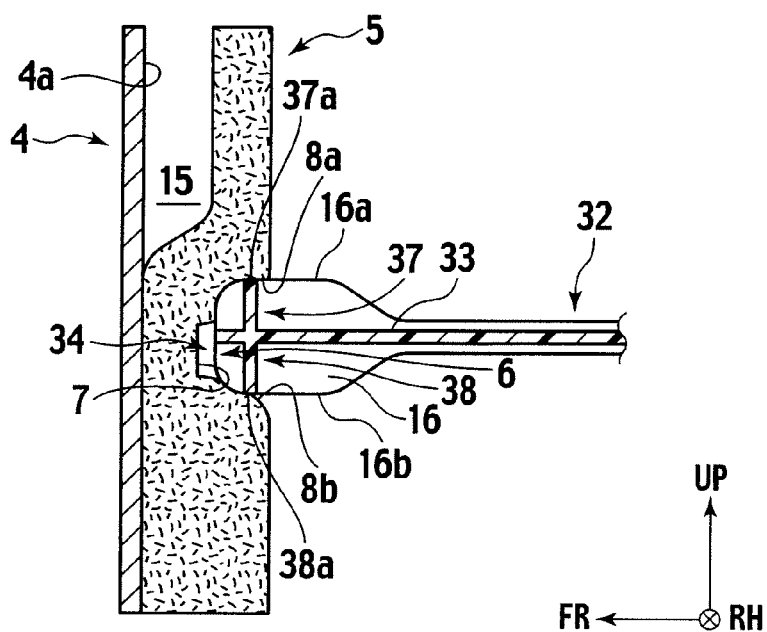
FIG. 14 is a cross-sectional view illustrating a configuration of a part of an under-cover support structure according to a second example, the part being corresponding to that shown in FIG. 3.

FIG. 14 shows a vehicle under-cover structure according of a second example of the above-described embodiment of the present invention.

Here, components which are the same as, or similar to, those in the embodiment are denoted by the same reference numerals.

In the second embodiment, reinforcing ribs 37 and 38 for connecting each perpendicular rib 16 are provided respectively on an upper surface and a lower surface of a sound insulator board 33 constituting an under cover member 32, the perpendicular ribs 16 being provided on a dash-insulator-side press-fit end portion 34.

The reinforcing ribs 37 are provided on the upper surface of the sound insulation board 33 so as to each extend approximately perpendicularly upward, while the reinforcing ribs 38 are provided on the lower surface of the sound insulation board 33 so as to each extend approximately perpendicularly downward. The upper edges 37a of the reinforcing ribs 37 is positioned flush with the upper edges 16a of the perpendicular ribs 16 that are on the upper side, and the lower edges 38a of the reinforcing ribs 38 is positioned flush with the lower edges 16b of the perpendicular ribs 16 that are on the lower side.

The upper edges 37a of the reinforcing ribs 37 and the lower edges 38a of the reinforcing ribs 38 are configured to abut respectively against the upper periphery 8a and the lower periphery 8b of the guide slope portion 8 across the entire width of the forward edge of the sound insulation board 33 in a state where the dash-insulator-side press-fit end portion 34 is press-fitted into the recessed portion 6.

The under-cover support structure of the second example configured as described above has the following effect in addition to those of the above-described embodiment and the first example. The upper edges 37a of the reinforcing ribs 37 and the lower edges 38a of the reinforcing ribs 38 abut respectively against the upper periphery 8a and the lower periphery 8b of the guide slope portion 8 in a state where the dash-insulator-side press-fit end portion 34 is press-fitted into the recessed portion 6.

Accordingly, the air flow between the upper side and the lower side of the sound insulation board 33 is securely blocked by the reinforcing ribs 37 and 38. Hence, a further improved sound insulation performance can be achieved.

Since other configurations and effects of this under-cover support structure are same as, or similar to, those of the above-described embodiment and the first example, descriptions thereof are omitted here.

THIRD EXAMPLE

Figure 15:
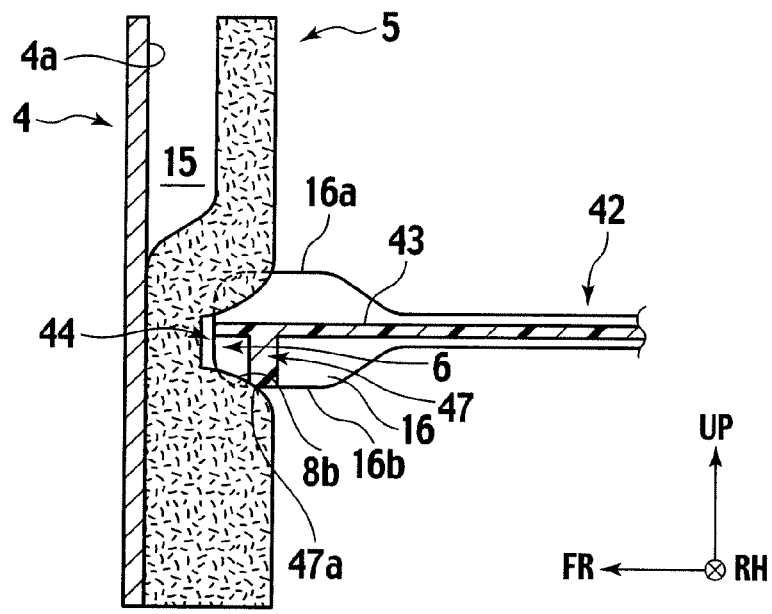
FIG. 15 is a cross-sectional view illustrating a configuration of a part of an under-cover support structure according to a third example, the part being corresponding to that shown in FIG. 3.

FIG. 15 shows a vehicle under-cover structure of a third example of the above-described embodiment of the present invention.

Here, components which are the same as, or similar to, those in the embodiment are denoted by the same reference numerals.

In the third embodiment, reinforcing ribs 47 for connecting each perpendicular rib 16 are provided on a lower surface of a sound insulation board 43 constituting an under cover member 42, the perpendicular ribs 16 being provided on a dash-insulator-side press-fit end portion 44.

The reinforcing ribs 47 are provided on the lower surface of the sound insulation board 43 so as to each extend approximately perpendicularly downward. Lower edges 47a of the reinforcing ribs 47 are positioned flush with the lower edges 16b of the perpendicular ribs 16 that are provided on the lower side.

The lower edges 47a of the reinforcing ribs 47 are configured to abut against the lower periphery 8b of the guide slope portion 8 across the entire width of the forward edge of the sound insulation board 43 in a state where the dash-insulator-side press-fit end portion 44 is press-fitted into the recessed portion 6.

The under-cover support structure of the third example configured as described above has the following effect in addition to those of the above-described embodiment, and the first and second examples. The lower edges 47a of the reinforcing ribs 47 abut against the lower periphery 8b of the guide slope portion 8 in a state where the dash-insulator-side press-fit end portion 44 is press-fitted into the recessed portion 6. Accordingly, the air flow between the upper side and the lower side of the sound insulation board 43 is securely blocked by the reinforcing ribs 47. Hence, a further improved sound insulation performance can be achieved.

Moreover, this under-cover support structure does not include the reinforcing ribs 37 for the upper side. Accordingly, the improved sound insulation performance can be achieved with less material compared to that of the second example.

Since other configurations and effects of this under-cover support structure are same as, or similar to, those of the above-described embodiment, and the first and second examples, descriptions thereof are omitted here.

FOURTH EXAMPLE

Figure 16:
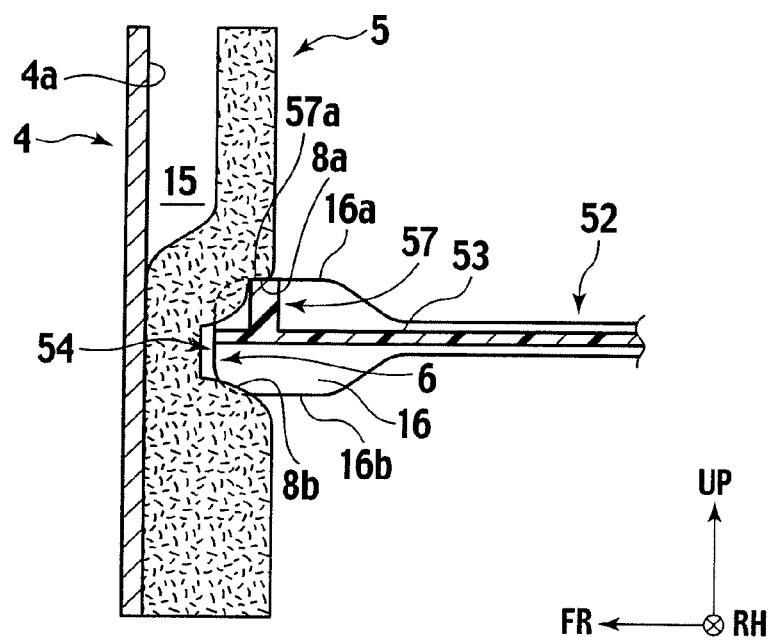
FIG. 16 is a cross-sectional view illustrating a configuration of a part of an under-cover support structure according to a fourth example, the part being corresponding to that shown in FIG. 3.

FIG. 16 shows a vehicle under-cover structure of a fourth example of the above-described embodiment of the present invention.

Here, components which are the same as, or similar to, those in the embodiment are denoted by the same reference numerals.

In the fourth example, reinforcing ribs 57 for connecting each perpendicular rib 16 are provided on an upper surface of a sound insulation board 53 constituting an under cover member 52, the perpendicular ribs 16 being provided on a dash-insulator-side press-fit end portion 54.

The reinforcing ribs 57 are provided on the upper surface of the sound insulation board 53 so as to each extend approximately perpendicularly upward. Upper edges 57a of the reinforcing ribs 57 are positioned lower, in the vertical direction, than the upper edges 16a of the perpendicular ribs 16 that are provided on the upper side.

The upper edges 57a of the reinforcing ribs 57 are configured to abut against the upper periphery 8a of the guide slope portion 8 across the entire width of the forward edge of the sound insulation board 53 in a state where the dash-insulator-side press-fit end portion 54 is press-fitted into the recessed portion 6.

In the under-cover support structure of the fourth example configured as described above, the upper periphery 8a of the guide slope portion 8 elastically deforms to a larger extent than the lower periphery 8b, because of the hollow portion 15 provided, as a more deformable portion, between the cabin-side surface 4a of the dash panel 4 and the dash insulator 5. Consequently, the upper periphery 8a bulges out to abut against the upper edges 57a of the reinforcing ribs 57.

With this configuration, this under-cover support structure has the following effect in addition to those of the above-described embodiment, and the first to third examples. The upper edges 57a of the reinforcing ribs 57 securely abut against the upper periphery 8a of the guide slope portion 8 in a state where the dash-insulator-side press-fit end portion 54 is press-fitted into the recessed portion 6. Accordingly, the air flow between the upper side and the lower side of the sound insulation board 53 is securely blocked by the reinforcing ribs 57.

Thus, an improved sound insulation performance can be achieved with less material compared to the third example using the reinforcing ribs 47 on the lower side.

Since other configurations and effects of this under-cover support structure are same as, or similar to, those of the above-described embodiment, and the first to third examples, descriptions thereof are omitted here.

The preferred embodiment and the first to fourth examples described herein are illustrative and not restrictive, and the invention may be practiced or embodied in other ways without departing from the spirit or essential character thereof. Specifically, in the descriptions of the embodiment and the first to fourth examples, the reinforcing ribs 17 or the like for connecting each perpendicular rib are provided at least one of the upper surface and the lower surface of the sound insulation board 13 or the like. However, the reinforcing ribs are not limited to the above configuration, and may be in any shape, may be of any number, and may be formed of any material. For example, the reinforcing ribs 17 may be omitted, or may be arranged in parallel on one of, or both, the upper and lower surfaces of the sound insulation board 13. The scope of the invention being indicated by the claims, and all variations which come within the meaning of claims are intended to be embraced herein.

The present disclosure relates to subject matters contained in Japanese Patent Application No. 2007-209718, filed on Aug. 10, 2007, the disclosure of which is expressly incorporated herein by reference in its entirety.

What is claimed is:

1. An under-cover support structure comprising:
a dash panel provided in a front part of a vehicle cabin;
a dash insulator attached to and extending along a cabin-side surface of the dash panel;
an instrument panel mounted on the dash insulator in an inner side of the vehicle cabin; and
an under cover member bridged between the cabin-side surface of the dash panel and a forward edge of a lower edge portion of the instrument panel, and covering a lower side of the instrument panel, the under cover member having a press-fit end portion on a side of the dash insulator, wherein
the dash insulator is provided with a supporting portion which is elastically deformable by the press-fit end portion of the under cover member being pressed against the supporting portion.

2. The under-cover support structure according to claim 1, wherein
the supporting portion comprises a recessed portion formed on the dash insulator, into which the press-fit end portion of the under cover member is press-fitted.

3. The under-cover support structure according to claim 1, wherein
the instrument panel includes a rear supporting portion which is formed at the forward edge of the lower edge portion, and which supports a rearward edge of the under cover member, and
the rearward edge of the under cover member is engaged with the rear supporting portion in a direction orthogonal to a direction of the press-fitting of the under cover member and fixed thereto.

4. The under-cover support structure according to claim 2, wherein
the recessed portion is provided with a deformable portion which allows an upper periphery of the recessed portion to be more deformable than a lower periphery of the recessed portion.

5. The under-cover support structure according to claim 4, wherein
the deformable portion is formed of a hollow portion which is a gap formed between the dash insulator and the dash panel.

6. The under-cover support structure according to claim 1, wherein
a rib is formed on a plain plate portion of the under cover member along a forward edge of the under cover member, the rib being in a plate shape having a normal vector approximately parallel to the vehicle-width direction.

7. The under-cover support structure according to claim 6, wherein
a plurality of the ribs are arranged at unchanged intervals, and
a reinforcing rib for connecting the ribs is provided on at least one of upper and lower surfaces of the plain plate portion.

8. The under-cover support structure according to claim 7, wherein
an upper or a lower edge of the reinforcing rib abuts against a surface of the dash insulator with the under cover member being press-fitted into a recessed portion.

9. The under-cover support structure according to claim 2, wherein a guide slope portion is provided to the recessed portion.

* * * * *